(12) United States Patent
Bauer et al.

(10) Patent No.: US 6,345,432 B1
(45) Date of Patent: Feb. 12, 2002

(54) METHOD FOR MANUFACTURING HOUSING OR CONTROL-COMPONENT PARTS OF METAL

(75) Inventors: Karl-Heinz Bauer, Bad Neustadt; Joachim Storath, Salz; Gerold Eckert, Bad Neustadt; Klaus Mueller, Unsleben, all of (DE)

(73) Assignee: Preh-Werke GmbH & Co. KG, Bad Neustadt/Saale (DE)

( * ) Notice: Subject to any disclaimer, the term of this patent is extended or adjusted under 35 U.S.C. 154(b) by 0 days.

(21) Appl. No.: 09/544,469

(22) Filed: Apr. 7, 2000

(30) Foreign Application Priority Data

Apr. 7, 1999 (DE) .......................................... 199 15 510

(51) Int. Cl.$^7$ ................................................ B23P 17/00
(52) U.S. Cl. ........................ 29/527.1; 29/846; 200/293; 205/122
(58) Field of Search .................... 29/527.1, 846; 200/293; 205/122

(56) References Cited

FOREIGN PATENT DOCUMENTS

| DE | 903316 C | 2/1954 |
|----|----------|--------|
| DE | 1296355 | 5/1969 |
| DE | 28505557 | 5/1979 |
| FR | 2260441 A | 9/1975 |

OTHER PUBLICATIONS

Hella KG: "Optimales Klima durch vollautomatisches Regelsystem" AZT AZI–Automobiltechnische Zeitschrift, vol. 100, No. 12, Dec. 1998, p. 879 XP002141240.

*Primary Examiner*—P. W. Echols

(57) ABSTRACT

A method for manufacturing housing or control-components parts of metal including the steps of: manufacturing a housing or control-component part (1, 3) as a forged or cast blank (4, 5), stamping a recess (6) in the blank for an indicator insert with a stamping die in a stamping device, thereby creating a protrusion (7) on a back wall surface (8) of the part in the stamping direction, constricting the recess (6) with peeled protrusions of the peripheral walls (9) defining the recess (6), injecting a transparent plastic (2) into the recess (6) and, if applicable, into a mold connected with the recess (6) for forming a collar (10) on a front wall surface (11) in the stamping direction, and ablating the back wall surface (8) and the protrusion (7) by a fixed thickness amount (12), which results in exposure of the recess (6) and of the transparent plastic (2).

8 Claims, 3 Drawing Sheets

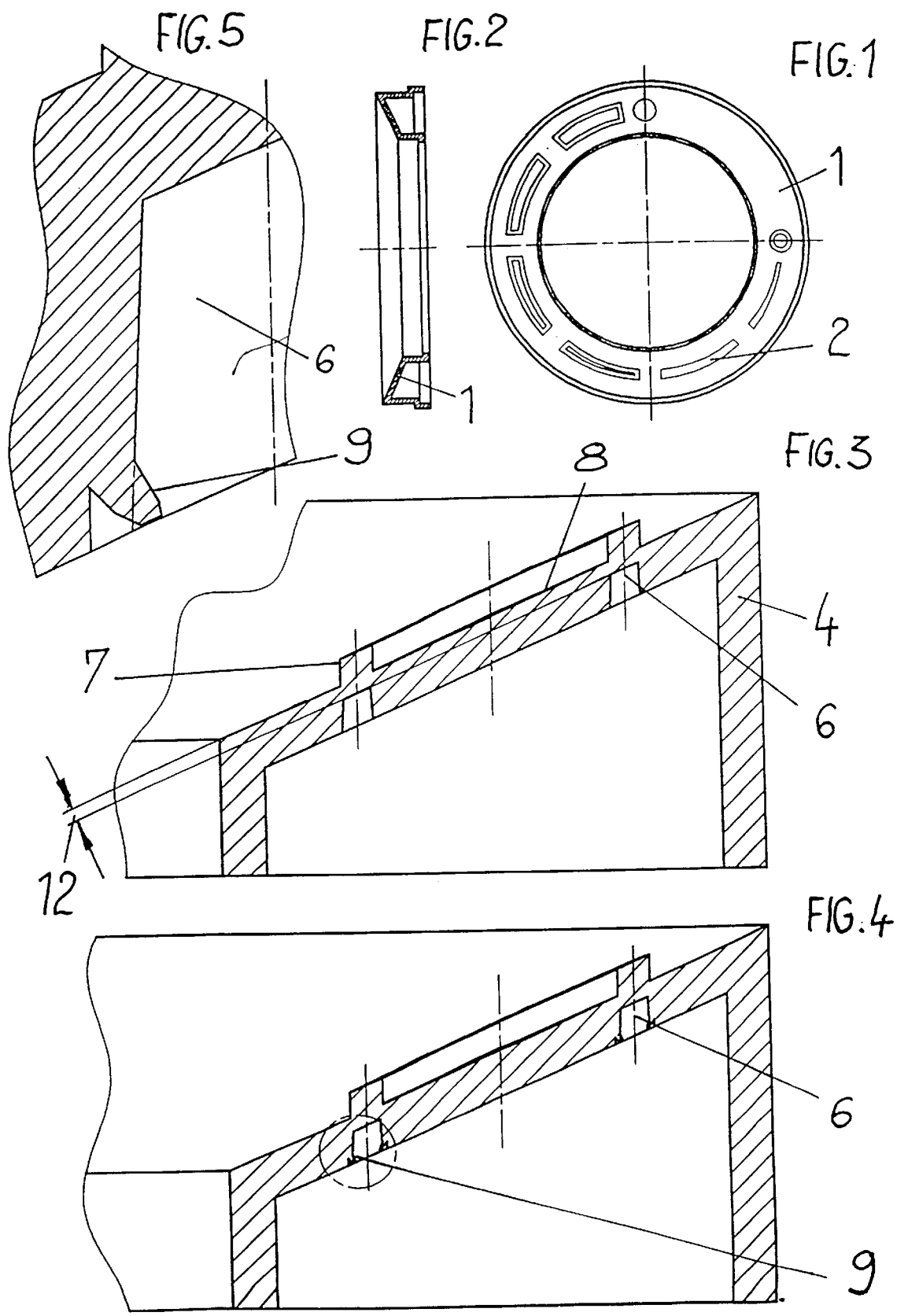

METHOD FOR MANUFACTURING HOUSING OR CONTROL-COMPONENT PARTS OF METAL

BACKGROUND OF THE INVENTION

This invention relates to a method for manufacturing metal housing or control-component parts having clear plastic indicator inserts.

In comparison to housing or control-component parts made of plastic, metal housing or control-component parts improve the appearance and the readability of various control devices in vehicles, such as navigation systems or heat adjustment systems, lighting devices, etc.

The ATZ-Automobiltechnische Zeitschrift (Journal of Automotive Technology) of December 1998, no. 12, p. 879 discloses one such example. It is stated therein that even during development of a climate regulation system, design, or aesthetics, plays an important role. The system described therein provides for each of two rotary switches for temperature adjustment to be backed with a forged aluminum ring into which optical light guides are integrated for nighttime operation.

In the illustration of a control element backed with aluminum rings shown therein, the optical light guides are in one instance integrated into the rings to be visible as symbols, as are also other symbols positioned on the push buttons. In comparison to the symbols on the rings, those on the push buttons clearly show "islands" within the symbols that are not transparent.

These islands are the reason that such symbols are not placed on metal housings or control-component parts, because during manufacture of recesses to be filled with transparent plastic these islands would fall out.

It is an object of this invention to provide steps for a method of manufacturing such metal housing or control-component parts which makes possible creation of symbols having islands.

SUMMARY OF THE INVENTION

According to principles of this invention, a housing and control-component part is manufactured as a forged or cast blank. A recess is then formed therein for receiving an indicator insert using a stamping die in a stamping device, while also causing a protrusion on a back wall surface, in the stamping direction, of the part. The recess is then constricted by making a peeled protrusion on peripheral walls defining the recess. The transparent plastic is then injected into the recess. A back wall surface and the protrusion is then ablated by a fixed thickness amount, which results in exposure of the recess and the transparent plastic at the back wall. Advantageous additional steps are also described herein.

The appearances of metal housing and control-component parts manufactured by this method are improved.

BRIEF DESCRIPTION OF THE DRAWING

The invention is described and explained in more detail below using embodiments shown in the drawings. The described and drawn features can be used individually or in preferred combinations in other embodiments of the invention. The foregoing and other objects, features and advantages of the invention will be apparent from the following more particular description of preferred embodiments of the invention, as illustrated in the accompanying drawings in which reference characters refer to the same parts throughout the different views. The drawings are not necessarily to scale, emphasis instead being placed upon illustrating principles of the invention in a clear manner.

FIGS. 1 and 2 respectively are plan and sectional views of an aluminum ring on which the process of this invention is used;

FIGS. 3 through 8 are enlarged sectional views of portions of the ring of FIG. 2 corresponding to process steps of this invention and its enhancements.

DESCRIPTION OF THE PREFERRED EMBODIMENT

Figure 6:
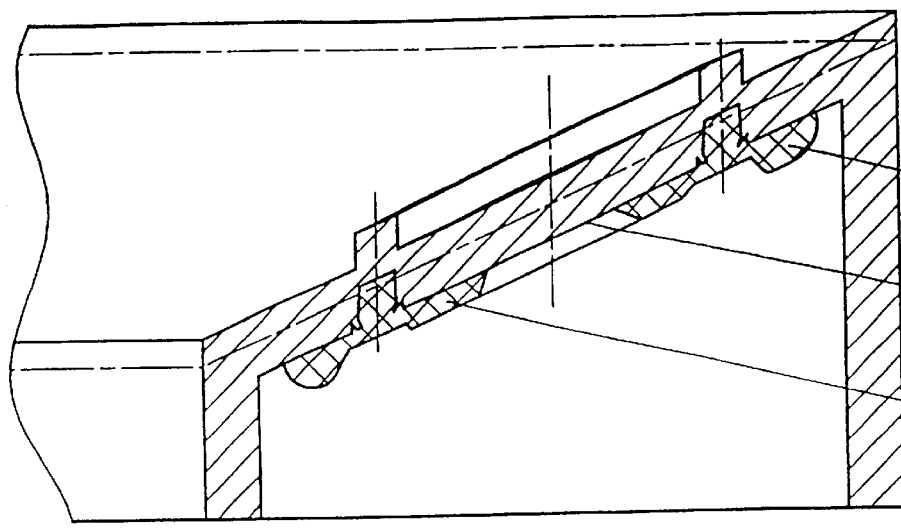
Figure 7:
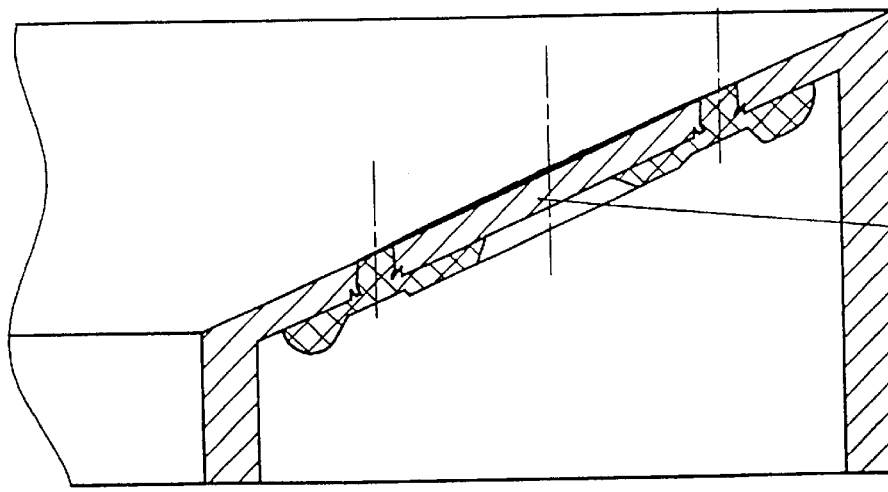

FIG. 1 shows a view of an aluminum ring 1 that is for being positioned behind a rotary switch as part of a fixed, control-component housing (not shown). The control component itself can be incorporated into a vehicle.

The aluminum ring 1 is equipped with an indicator insert of a transparent resinous plastic 2, which, illuminated from the back, is for serving as a nighttime indicator. This aluminum ring 1 can, as can a push-button switch shown in FIG. 9, be produced with a method for manufacturing metal housing or control-component parts equipped with transparent plastic indicator inserts, in which method the following procedure steps are used:

Manufacturing of the housing or adjustment part 1, 3 as a forged or cast blank 4, 5;

Forming a recess, or depression, 6 for the indicator insert of transparent plastic 2 with a stamping die in a stamping device, while creating a protrusion 7 on a back wall surface 8 in a stamping direction, as shown in FIG. 3;

Constricting the recess 6 with a wedge-shaped peel deformation of peripheral walls 9 defining the recess 6, with which the indicator insert will subsequently be held in position inside the recess 6;

Injecting the transparent plastic 2 into the recess 6 and, if applicable, into a mold connected with the recess 6 for forming a collar 10 on a front-wall (relative to the stamping direction) surface 11 so that additional fixing of the plastic 2 or of the indicator insert to the housing and control-component part 1 or 3 is achieved;

Ablation of the back wall surface 8 and the protrusion 7 of a specific thickness amount 12, resulting in exposure of the recess 6 and of the transparent plastic 2; that is, creation of the recess 6, reduced by the thickness amount 12, results in a wall of a thickness amount holding islands 13 of symbols in their specified positions during injection.

It is advantageous if a following additional process step is performed, Surface Protection of the wall surface 8 opened up by the ablation, which can be achieved by creating an anodized layer if the housing or control component 1, 2 is made of aluminum or of an alloy containing aluminum, with anodization resulting from electrical bonding, or contacting, of also each of the islands 13 that are electrically separated through the ablation.

It can be provided that a mechanical ablation results, for example, by turning on a lathe or by milling to the thickness amount 12, or by a mechanical ablation of the protrusion followed by exposure of the recess 6 and the transparent plastic 2 by laser ablation.

Figure 8:
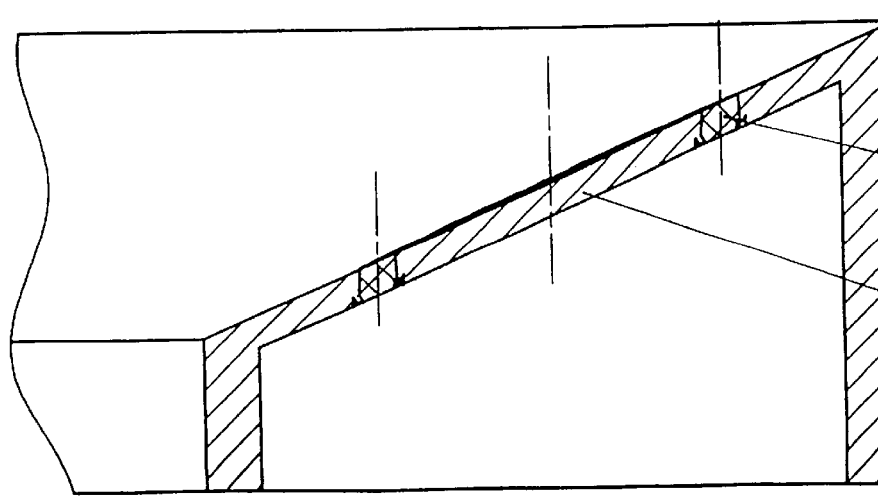

It may be necessary, in a subsequent process step, for ablation of the collar 10 to occur on the front wall surface 11 to achieve greater transparency of the indicator insert (see FIG. 8).

Figure 9:
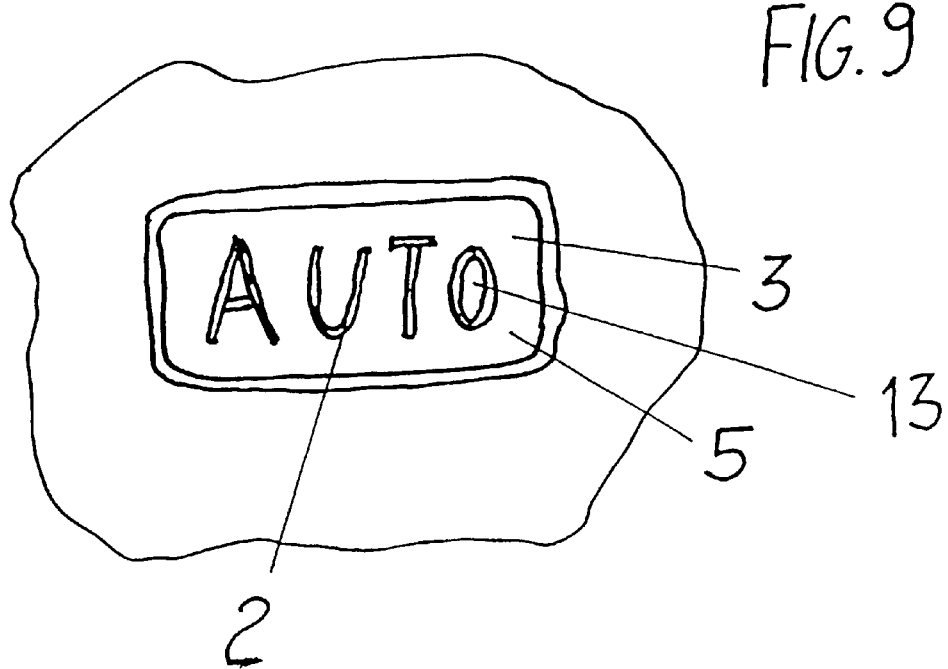
FIG. 9 is a plan view of a push button switch having symbols featuring islands, which this invention make possible.

The processing of the push-button switch 3 shown in FIG. 9 takes place in a manner analogous to that of the aluminum ring 1.

The aluminum ring 1 or the push-button switch 3 can be colored after the anodized layer is created.

It is self-evident that the housing part 1 with the plastic inserts can also be used solely for decorative purposes, for example for edging an air vent.

The invention claimed is:

1. A method for manufacturing at least one of a housing and control-component part of metal having a clear plastic indicator insert comprising the following process steps:

manufacturing said at least one of said housing and control-component part as a forged or cast blank of metal, forming a recess for the indicator insert with a stamping die in a stamping device while causing a protrusion on a back wall surface in the stamping direction, constricting the recess by causing a protrusion on peripheral walls of the recess, injecting transparent plastic into the recess, ablating the back wall surface and the protrusion by a fixed thickness amount, which results in exposure of the recess and the transparent plastic at the back wall.

2. The method of claim 1, wherein a surface protective layer is placed on the back wall surface exposed by the ablation.

3. The method of claim 2, wherein the at least one of said housing and said control-component part is made of an aluminum containing material and the surface protection layer is created as an anodized layer in a same step that electrically contacts islands that are separated through the ablation.

4. The method of claim 3, wherein the anodized layer is colored.

5. The method of claim 1, wherein the ablation step is carried out by mechanical ablation.

6. The method of claim 1, wherein part of the ablation step is carried out by mechanical ablation and subsequent exposure of the recess and the transparent plastic is carried out by laser ablation.

7. The method of claim 1, wherein, during the injecting step, a collar is injected onto a front wall surface and at least some of this collar is subsequently removed by ablation.

8. The method of claim 1, wherein, during the injecting step, a collar is injected onto a front wall surface.

* * * * *